Jan. 19, 1965 D. W. HALL ET AL 3,166,133
SEALING MEANS
Filed April 23, 1963 3 Sheets-Sheet 2

INVENTORS:
Donald W. Hall
Bryce D. Troyer
BY
Attorney

Jan. 19, 1965  D. W. HALL ET AL  3,166,133
SEALING MEANS
Filed April 23, 1963  3 Sheets-Sheet 3

INVENTORS
Donald W. Hall
Bryce D. Troyer
BY
Attorney

United States Patent Office 3,166,133
Patented Jan. 19, 1965

3,166,133
SEALING MEANS
Donald W. Hall and Bryce D. Troyer, Boulder, Colo.,
assignors to the United States of America as represented by the United States Atomic Energy Commission
Filed Apr. 23, 1963, Ser. No. 275,176
10 Claims. (Cl. 177—135)

The present invention relates generally to sealing means and more particularly to sealing means wherein a liquid may act as a barrier and through which force transmission may be accomplished in an essentially frictionless manner.

In working with radiation contaminated or radioactive materials, a dry box system or a similar enclosed system is frequently used so that the required handling of the materials may be accomplished without exposing personnel and equipment to the confined materials. Oftentimes during such handling it is desirable to weigh the materials; however, since these materials must remain inside the dry box system because of the radiation hazards involved, several problems arise. For example, the weighing should be precise, but due to the difficulties accompanying the use of precision weighing equipment contained within the corrosive atmosphere of the dry box, it has become necessary to place the weighing equipment outside of the dry box. Attempts have been made to provide for weighing of the contaminated materials by extending slings or the like from the weighing equipment through an opening in the walls of the dry box. However, this procedure has not been very satisfactory because of the leakage of contaminated products through the opening. Efforts to provide a seal arrangement about the opening for preventing such leakage have not solved the problem since such seals generate a friction factor acting against movable portions of the weighing equipment to decrease the accuracy or reliability of the weighing equipment. Another method heretofore used to combat the leakage problem has been to install an enclosure about the weighing equipment to contain the contamination. However, this method has not proved to be satisfactory since it exposes the weighing equipment to radioactive contamination.

The present invention aims to overcome the above and other difficulties or disadvantages by providing a relatively simple and inexpensive construction which is adapted to prevent leakage of contamination products while at the same time enabling the transmission of force in an essentially frictionless manner.

An object of the present invention is to provide a new and improved means for sealing openings in enclosures that are adapted to contain contaminated or radioactive materials while permitting weight bearing means to move frictionlessly through the seal.

Another object of the present invention is to provide a new and improved combined liquid barrier and means for transmitting force through the barrier.

Another object of the present invention is to provide a liquid seal having force transmitting means which are substantially unaffected by the buoyancy of the sealing liquids.

A further object of the present invention is to provide a liquid seal having force transmitting means, wherein changes in pressure differentials across the seal and resulting changes in liquid levels do not change the total buoyant effect on the force transmitting means.

Other and further objects of the invention will be obvious upon an understanding of the illustrative embodiments about to be described, or will be indicated in the appended claims, and various advantages not referred to herein will occur to one skilled in the art upon employment of the invention in practice.

Preferred embodiments of the invention have been chosen for purposes of illustration and description. The preferred embodiments illustrated are not intended to be exhaustive nor to limit the invention to the precise forms disclosed. They are chosen and described in order to best explain the principles of the invention and their application in practical use to thereby enable others skilled in the art to best utilize the invention in various embodiments and modifications as are best adapted to the particular use contemplated.

Figure 1:
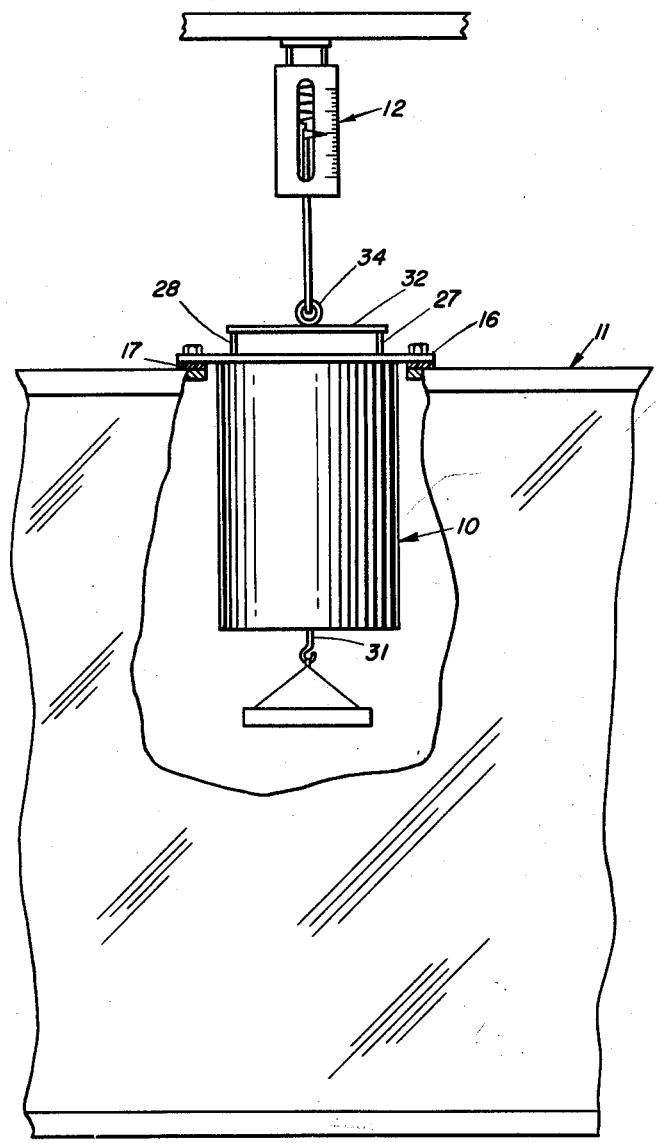
FIG. 1 is a fragmentary view of a portion of a conventional dry box showing the present invention extending through a wall thereof.

With reference to FIG. 1 the force transmitting seal arrangement of the present invention, as generally indicated at 10, is particularly suitable for use in environments where radioactive materials are contained in an enclosed space. As an example of such usage, the seal arrangement 10 is shown extending through an upper wall of a conventional dry box generally indicated at 11. The seal arrangement 10 is so positioned that a suitable weighing mechanism, such as generally and diagrammatically indicated at 12, may be located externally of the dry box and be operatively attached to the force transmitting portion of the seal arrangement as will be hereinafter described. This particular feature enables contaminated materials within the dry box to be precisely weighed without endangering working personnel or subjecting the weighing mechanism to the contaminated materials.

Figure 2:
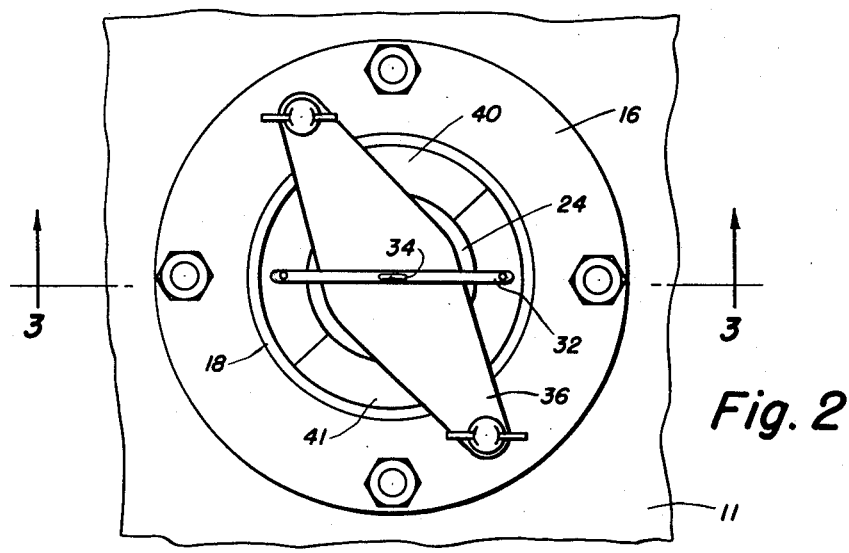
FIG. 2 is a top plan view of a preferred embodiment of the present invention.
Figure 3:
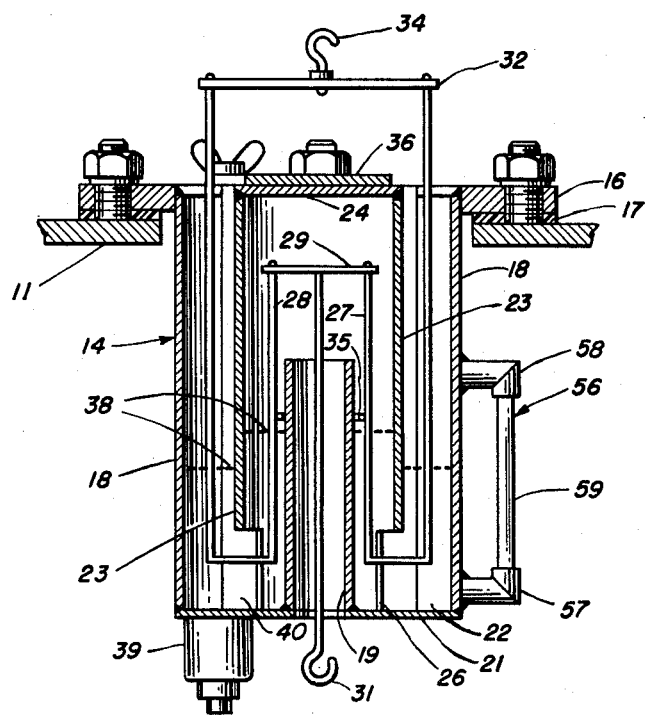
FIG. 3 is a sectional view taken generally along line 3—3 of FIG. 2.

Referring more particularly to FIGS. 2 and 3, a preferred form of the present invention is shown comprising an annular cup-shaped housing, generally indicated at 14, that is adapted to be secured to a wall of the dry box wall 11 in any suitable manner, such as, for example, by providing a flange 16 at one end of the housing and bolting or otherwise securing it to the dry box wall. A deformable gasket 17 of a suitable plastic material may be disposed between the flange 16 and the dry box wall 11 to assure that contaminated materials do not pass therebetween. While the flange 16 is shown disposed on the housing 14 at such a location that substantially the entire housing 14 extends into the dry box it will appear clear that the flange 16 may be disposed at any desired location on the housing to enable the positioning of any desired portion of the housing in the dry box.

The annular cup-like housing 14 comprises an outer tubular wall 18 and an inner tubular wall 19 inwardly spaced from and coaxially disposed therewith. Walls 18 and 19 may be connected together by an annular plate 21 which may be welded or otherwise secured to each tubular wall adjacent the end thereof that extends innermost into the dry box. The inner wall 19, which is somewhat shorter than the wall 18, and the annular plate 21 coact with wall 18 to provide an annular liquid retaining cavity 22. The purposes of the shorter wall 18 and the cavity 22 will be described below.

An "inverted cup" arrangement shown comprising a tubular wall 23 and an end plate 24 may be disposed within the housing 14 so that the wall 23 extends into the cavity 22 intermediate the walls 18 and 19 and abuts against the annular plate 21. The wall 23 is preferably the same length as the wall 18 and of a diameter intermediate the diameters of the walls 18 and 19. With wall 23 so positioned, it has one end thereof on essentially the same horizontal plane as the uppermost or the flanged end of the wall 18 while the other or innermost end rests against the annular plate 21. Portions adjacent the end of the wall 23 resting on the end plate 21 may be removed to provide a pair of oppositely disposed apertures 26 for enabling a part of the force transmitting means to pass therethrough as will be hereinafter described. These apertures 26 should provide openings through the wall 23 of sufficient overall dimensions as to facilitate unrestricted vertical movement of the force transmitting means.

The inverted cup arrangement when disposed within the housing 14 forms therewith a labyrinthic passage extending from within the innermost end of the tubular wall 19 to an outermost end of the housing intermediate walls 18 and 23. This passage is adapted to accommodate the force transmitting means which may include a pair of generally U-shaped rod-like members 27 and 28 disposed at opposite sides of the wall 23. Each of the U-shaped members may comprise a pair of "leg" portions, one of which vertically extends between the tubular walls 18 and 23 and the other of which vertically extends between the walls 19 and 23. These leg portions of each U-shaped member may be interconnected by a bight extending through one of the apertures 26 with the bight being integral with or secured to the leg portions in any suitable manner.

The legs of the U-shaped members 27 and 28 that are disposed between the walls 19 and 23 may have end portions terminating at a location intermediate the distal or uppermost end of the wall 19 and the plate 24. These end portions of each U-shaped member may be connected together by a transversely extending bar 29 which may be secured to the legs in any suitable manner, such as by welding or the like. The bar 29 passes over the center of the tubular wall 19 so that a vertically extending load supporting rod 31 may be attached thereto by welding or the like. This rod 31 is preferably centrally disposed in the housing so that it extends through the vertical opening in the tubular wall 19 and into the interior of the dry box 11 where it may be provided with a suitable hook arrangement or other suitable attaching means for supporting the material to be weighed.

The other legs of the U-shaped members disposed between the walls 18 and 23 extend to locations upwardly spaced from the flanged end of the housing and are adapted to be interconnected by another transversely extending plate or bar 32. This bar 32 may be provided with a centrally disposed hook or the like 34 for facilitating attachment to any suitable weighing mechanism, the spring balance indicated by the reference character 12 being intended to denote any appropriate weighing mechanism, e.g., spring type, balance type, etc.

The force transmitting means constructed as shown may move in a vertical path as a unitary assembly, thus exerting an essentially straight pull upon a weight attached to the support rod 31. An annular ring 35 may be placed about the wall 19 and be secured to the legs of the U-shaped members between walls 19 and 23 to strengthen the unitary assembly and maintain the legs in desired positions. The clearance between the top of the wall 19 and the inner surface of plate 24 should be such that the portion of the force transmitting means contained therebetween may move either vertically up or down a sufficient distance as to enable the attainment of the desired material weighing. The U-shaped members are shown in an intermediate vertical position for clarity of illustration.

In order to maintain the inverted cup-like assembly within the housing 14 in such a manner that the wall 23 continuously bears against the plate 21, a hold-down plate 36 may be placed over the plate 24 and then clamped, bolted or otherwise secured to the flange 16. The plate 36 may be of any desired shape, a generally diamond shape being shown in FIG. 2. This construction facilitates the removal of the inverted cup assembly in the event the force transmitting means or other structure needs replacement, maintenance or cleaning.

The seal or barrier for preventing leakage from within the dry box 11 may be attained by a suitable liquid, the levels of which are generally indicated at 38, within the cavity 22. The quantity of liquid should be such that it extends along opposite sides of the wall 23 to a height at least equal to or more than one half the length of the wall 19. This liquid seal provides a highly efficient barrier against leakage of air or contaminated materials from within the dry box, yet enables the force transmitting means to move essentially frictionlessly through the barrier.

While any of many liquids could be used to provide the liquid barrier, satisfactory results have been attained by using liquids of relatively high density and low surface tension such as mercury, or silicone compounds having specific gravities of about 1.5. Low density liquids such as water or ethylene-glycol may be used, but are not as desirable as the above mentioned higher density liquids since if the gloves of the dry box are rapidly pulled out of the dry box, the low density liquids may tend to be pulled out of the housing 14 and into the dry box.

The liquid 38 may eventually become contaminated, thus necessitating its removal and replacement by a similar quantity of non-contaminated liquid. To facilitate such liquid removal, a drain plug assembly 39 or the like may be placed in the housing in any suitable place such as, for example, in the annular plate 21.

In order to offset any changes in the effect of buoyancy upon the force transmitting means that may be caused by varying the quantity of the high density liquid contained on each side of the wall 23, it may be desirable to balance the annular areas or volumes on each side of the wall 23 such that a change in differential pressure across the seal does not change the buoyancy of the force transmitting means. In other words, a change in differential pressure across the seal will alter the liquid levels in the balanced volumes by raising the liquid level in one volume while simultaneously lowering the liquid level in the other volume by the same amount as to respectively cover and uncover equal lengths of the rod-like members and thereby maintain a constant buoyant effect on the force transmitting means. A satisfactory solution to such volume balancing may be achieved by placing a pair of elongate generally crescent-shaped members 40 and 41 in the space between the walls 18 and 23. These members 40 and 41 may be substantially coextensive in height with the wall 18 and be disposed on opposite sides of the tubular wall 23 with the apertures 26 therebetween. The circumferential volume occupied by these members 40 and 41 is, of course, dependent upon the difference between the two volumes to be balanced. Thus, for example, if the wall 23 is disposed closer to the wall 19, then the members 40 and 41 must be capable of filling a greater portion of the volume between walls 18 and 23. These members may be held in place by the hold-down plate 36.

In normal operation of a dry box system the interior of the dry box is preferably exposed to or maintained at an air pressure less than that of the surrounding atmosphere, so that if a leak occurs in the dry box, the air on the outside of the dry box is drawn into the dry box due to the pressure differential, thus assuring that the contaminated products are retained in the dry box. Usually a pressure differential of about 0.5 to 1.0 inch water is sufficient to achieve the desired leakage protection. Thus, in the embodiment of FIGS. 2 and 3, for example, the level of barrier liquid is affected by the differential pressure in such a manner that its level in the space between walls 18 and 23 is lower than the liquid level in the space between walls 19 and 23. In view of these different liquid levels, it is preferable that sufficient liquid be placed within the cavity 22 to assure that it is in contact with opposite sides of the wall 23 at all times.

The effect the differential pressure has upon the liquid barrier provides a basis for another feature of the present invention in that the liquid level may be readily determined at all times and at the same time be used as a positive gage for determining the differential pressure across the seal. As shown in FIG. 3, a sight gage generally indicated at 56 may be attached to the housing 14 and include a pair of vertically spaced apart conduits 57 and 58 which pierce the wall 18 and which have a suitable transparent tube of glass or the like 59 disposed therebetween. Conduit 57 may communicate with the cavity 22 immediately adjacent the plate 21 while conduit 58 preferably communicates with the cavity at a location slightly below the uppermost end of the wall 19. Thus, with the sight gage 56 in place, the rise and fall of the liquid as viewed through the transparent tube 59 provides a means for readily and positively ascertaining the level of the barrier liquid and the extent of the differential pressure. Since the liquids preferably used in the seal are of a somewhat greater density than water, a scale usable with the sight gage to indicate the differential pressure may be divided in increments suitable to the density of the particular liquid being used.

Figure 4:
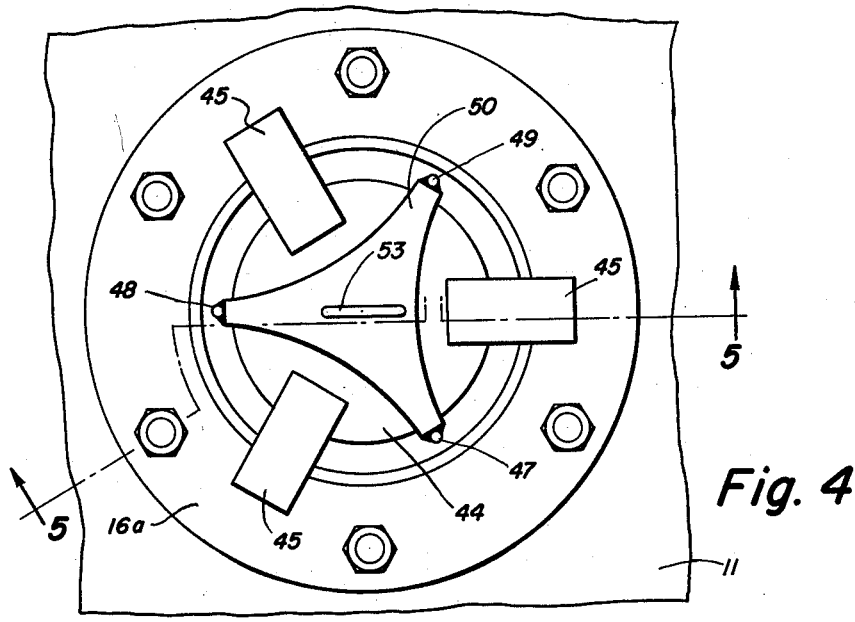
FIG. 4 is a top plan view of another form of the invention.
Figure 5:
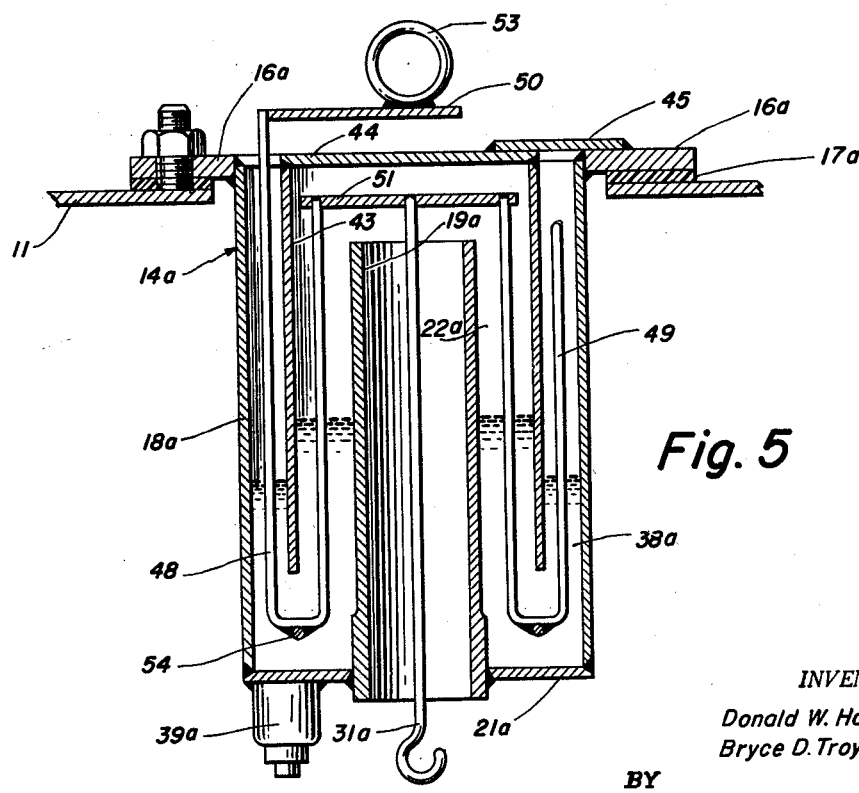
FIG. 5 is a sectional view taken generally along line 5—5 of FIG. 4.

The form of the invention shown in FIGS. 4 and 5 may have portions thereof constructed and arranged in a manner similar to the embodiment of FIGS. 2 and 3 above described. The primary differences between the two embodiments lie in the construction and placement of the inverted cup-like assembly and in the construction of the force transmitting means. In the interest of brevity and for purposes of description, reference numerals with the suffix $a$ are used where feasible with respect to the embodiment shown in FIGS. 4 and 5 to indicate portions which may be constructed and arranged similarly to portions bearing the same reference numerals in FIGS. 2 and 3.

The inverted cup-like assembly, as best shown in FIG. 5, may comprise a tubular wall 43 and an end plate 44. The wall 43, which may be of a length shorter than the wall 18a, may be disposed in the cavity 22a intermediate the walls 18a and 19a and spaced from the bottom plate 21a for facilitating the passage of a portion of the force transmitting means therethrough. The spacing between the innermost, or bottom end of the wall 43 and the bottom plate 21a may be maintained by suspending the inverted cup assembly into the cavity and thereafter securing it to the flange 16a by small metal fastening plates 45 which may overlay portions of the flange 16a and the end plate 44 and be secured thereto in any suitable manner such as for example welding, bolting, etc. The plates 45 may be three in number and be circumferentially spaced apart from each other about the periphery of the inverted cup assembly (FIG. 4).

The force transmitting means is shown comprising three generally U-shaped rod-like members 47, 48 and 49, each of which has a pair of vertically extending "legs" with a bight therebetween and arranged in a relationship to the walls 18a and 19a in a manner generally similar to the legs and bight of the U-shaped members 27 and 28 in FIGS. 2 and 3.

The U-shaped members may be circumferentially spaced apart from each other and be interconnected at opposite ends thereof by a pair of generally triangularly shaped plates 50 and 51. Plate 50 may be welded or otherwise secured to the exposed ends of the U-shaped members extending upwardly from a location within the housing 14a and be provided with a centrally disposed ring or the like 53 for attachment to a weighing mechanism 12. The other plate 51 may be secured by welding or the like to the ends of the U-shaped members terminating between the end plate 44 and the wall 19a and have attached thereto the support rod 31a. An annular brace 54 may be secured to the bight or any other suitable portion of each U-shaped member to provide support for the force transmitting means.

In this embodiment, the buoyancy of the U-shaped members may be compensated for in manner different from that above described with reference to the embodiment of FIGS. 2 and 3 in that the annular volumes between the walls 18a and 43 and the walls 19a and 43 are made substantially equal to one another. In order to equalize such volumes, the wall 43 may be of a diameter closer to the diameter of wall 18a than to the diameter of wall 19a so as to position the wall 43 closer to the wall 18a than to the wall 19a. This arrangement reduces the spacing between walls 18a and 43 to balance the volumes. It may be desirable to reduce the outer diameter of wall 19a to aid in the volume equalization.

The sight gage 56 may be readily used with the embodiment shown in FIGS. 4 and 5. Also, the liquid level in this embodiment should, of course, be maintained in contact with the opposite sides of wall 43 for the same reasons as noted for the embodiment of FIGS. 2 and 3.

It will be seen that the present invention sets forth a unique and relatively simple sealing means which is adapted to prevent leakage of contaminated products from within a confined space such as a dry box. The seal of the present invention may also be used with other enclosures where it is desired to maintain a sealed atmosphere within the enclosure or a pressure differential and yet allow movement of force transmitting means through the seal for accomplishing nay desired purpose.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

We claim:

1. A device of the character described comprising in combination an annular cup assembly including a pair of spaced apart coaxial upright walls, an inverted cup secured to said cup assembly with a wall portion thereof extending into the cup assembly intermediate said spaced apart upright walls to define therewith a labyrinthic passage, and means disposed in and extending through said passage for facilitating the transmission of force through said passage.

2. The device claimed in claim 1 wherein liquid is disposed within said annular cup assembly enveloping part of said means and contacting at least portions of opposite sides of said wall portion.

3. A device of the character described for use in combination with an enclosure having an opening through a wall thereof, said device comprising a housing extending through the opening and secured to said wall and including a pair of spaced apart generally coaxially arranged tubular upright portions with a common annular portion secured to said tubular portions at one end thereof to define an annular liquid receiving cavity therebetween, a tubular member including cap means enclosing one end thereof secured to said housing with a part of said member extending into said cavity intermediate said tubular portions for defining therewith a labyrinthic passage, force transmitting means disposed in and extending through said passage and spaced from said portions and said member adapted to support an article within the enclosure from a location externally thereof.

4. The device claimed in claim 3 wherein the other end of the innermost tubular portion is vertically spaced from said cap means and the other end of said tubular member has at least a portion thereof vertically spaced from said annular portion for defining said passage.

5. The device claimed in claim 4 wherein said force transmitting means comprises a generally U-shaped rod having upright portions thereof on opposite sides of said tubular member with an innerconnecting bight disposed in the space between said other end of said tubular member and said annular portion, and a further portion of said force transmitting means is disposed in and extends through said innermost tubular portion into the interior of the enclosure and is secured to said rod at a location intermediate said cap means and said other end of the innermost tubular portion.

6. The device claimed in claim 5 wherein said force transmitting means comprises at least a pair of said rods, the further portion of said force transmitting means is secured to each of said rods, and wherein another portion of said force transmitting means is secured to said rods at a location externally of said housing and the enclosure.

7. The device claimed in claim 3 wherein said tubular member divides said cavity into a pair of volumes each capable of containing, when said volumes are subjected to equal gas pressures, similar quantities of liquid in contacting relationship with said tubular member along a preselected length thereof.

8. The device claimed in claim 3 wherein elongate means partially encircles said member to fill a portion of the cavity between said member and one of said tubular portions and thereby essentially equalizing the quantity of liquid on opposite sides of said member when the liquid on said opposite sides of said member is subjected to equal gas pressures.

9. The device claimed in claim 8 wherein the other end of said member has other portions thereon abutting said annular portion, and wherein fastening means overlie said cap means and said elongate means to secure the same to said housing to maintain said member and one end of said elongate means against said annular portion.

10. The device claimed in claim 3 wherein liquid is disposed in said cavity to cover parts of said force transmitting means and to contact opposite sides of the part of said tubular member extending into said cavity.

References Cited by the Examiner
UNITED STATES PATENTS

| | | | |
|---|---|---|---|
| 742,579 | 10/03 | Brown | 277—17 |
| 1,766,788 | 6/30 | MacMahon | 177—180 X |
| 1,878,205 | 9/32 | Ulrich | 177—180 X |
| 1,931,706 | 10/33 | Powell | 277—135 |
| 1,937,447 | 11/33 | Tokheim | 73—321 |
| 2,109,985 | 3/38 | Archer | 277—17 |
| 2,541,862 | 2/51 | Cunningham | 177—180 |

FOREIGN PATENTS 6,471   3/11   Great Britain.

LEO SMILOW, *Primary Examiner.*